United States Patent [19]

Sanders

[11] Patent Number: 5,349,441
[45] Date of Patent: Sep. 20, 1994

[54] FIBER OPTIC GYROSCOPE REFRACTIVE INDEX INDUCED ERROR COMPENSATION

[75] Inventor: Glen A. Sanders, Scottsdale, Ariz.

[73] Assignee: Honeywell, Inc., Minneapolis, Minn.

[21] Appl. No.: 740,741

[22] Filed: Aug. 6, 1991

[51] Int. Cl.$^5$ ............................................. G01B 09/02
[52] U.S. Cl. ................................................. 356/350
[58] Field of Search ..................................... 355/350

[56] References Cited

U.S. PATENT DOCUMENTS 4,673,293 6/1987 Sanders ............................. 356/350

OTHER PUBLICATIONS

"Kerr Effect in an Optical Passive Ring-Resonator Gyro", K. Iwatsuki et al., *Journal of Lightwave Technology*, vol. LT-4(6), pp. 645–651, (1986).

*Primary Examiner*—Mark Hellner
*Attorney, Agent, or Firm*—John G. Shudy, Jr.

[57] ABSTRACT

An error compensator for a resonator fiber optic gyroscope extracting characteristics from the output signal of a photodetector, receiving electromagnetic waves from the resonator, and combining them to result in a determination of substantially the rotation rate error that is due to the effect of a nonlinear refractive index occurring in the resonator. This determination can be used to compensate the system output signal to eliminate rotation rate errors of such a nature therefrom.

24 Claims, 4 Drawing Sheets

FIBER OPTIC GYROSCOPE REFRACTIVE INDEX INDUCED ERROR COMPENSATION

BACKGROUND OF THE INVENTION

The present invention relates to fiber optic gyroscopes used for rotation sensing and, more particularly, to resonator fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates that can be a problem in other kinds of optical gyroscopes.

There are various forms of optical inertial rotation sensors which use the well known Sagnac effect to detect rotation about a pertinent axis thereof. These include active optical gyroscopes having the gain medium contained in an optical cavity therein, such as the ring laser gyroscope, and passive optical gyroscopes without any gain medium in the primary optical path, such as the interferometric fiber optic gyroscope and the ring resonator fiber optic gyroscope. The avoidance of having the active medium along the primary optical path in the gyroscope eliminates some problems which are encountered in active gyroscopes such as low rotation rate lock-in, bias drift and some causes of scale factor variation.

Interferometric fiber optic gyroscopes typically employ a single spatial mode optical fiber of a substantial length formed into a coil, this substantial length of optical fiber being relatively costly. Resonator fiber optic gyroscopes, on the other hand, are constructed with relatively few turns of a single spatial mode optical fiber giving them the potential of being more economical than interferometric fiber optic gyroscopes. A resonator fiber optic gyroscope typically has three to fifty meters of optical fiber in its coil versus 100 to 2,000 meters of optical fiber in coils used in interferometric fiber optic gyroscopes. In addition, resonator fiber optic gyroscopes appear to have certain advantages in scale factor linearity and dynamic range.

In either type of passive gyroscope, these coils are part of a substantially closed optical path in which an electromagnetic wave, or light wave, is introduced and split into a pair of such waves, to propagate in opposite directions through the optical fiber coil to both ultimately impinge on a photodetector or photodetectors, a single photodetector for both waves in interferometric fiber optic gyroscopes and on corresponding ones of a pair of photodetectors inn resonator fiber optic gyroscopes. Rotation about the sensing axis of the core of the coiled optical fiber in either direction provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce corresponding phase shifts between those waves in interferometric fiber opticgyroscopes, or corresponding different optical cavity effective optical path lengths for these waves in a resonator fiber optic gyroscope.

In this latter instance, one or more optical frequency shifters are used to each effectively adjust the frequency of a corresponding one of the pair of electromagnetic waves that circulate in opposite directions in the resonator fiber optic coil. This is accomplished through such a frequency shifter shifting the frequency of a corresponding input electromagnetic wave giving rise to the resonator electromagnetic wave of interest. As a result, through feedback arrangements, the frequencies of each member of the pair of electromagnetic waves can be kept in resonance with the effective optical path length that wave is experiencing in the resonator fiber optic coil. Hence, any frequency difference between these waves becomes a measure of the rotation rate experienced by the resonator fiber optic coil about the axis around which this coil has been positioned. In such resonances, each wave has the portions thereof that previously were introduced in resonator 10 and have not yet dissipated, and the portions thereof currently being introduced in resonator 10, at a frequency such that they are all in phase with one another so they additively combine to provide a peak in the intensity of that wave in that resonator over a local range of frequencies.

The difference in frequency between the members of the pair of opposing electromagnetic waves in a resonant fiber optic gyroscope is desired to be constant when rotation conditions about the resonator optic fiber coil axis are unchanging thereby requiring that stable resonance conditions occur in that resonator in those circumstances. Furthermore, there are several advantages in achieving frequency shifting of the resonator electromagnetic waves by operating one or more integrated optics phase modulators for this purpose through each of which the corresponding input electromagnetic wave transmitted. These advantages involve economics, packaging volume, and performance. Obtaining a constant frequency difference between these resonator wave pair members using such a phase modulator requires that the phase modulator change phase in the form of a linear ramp since the derivative of phase with respect to time yields the frequency.

Because of the impossibility of having a phase modulator provide an infinite duration linear ramp with respect to time, a repetitive linear ramp with periodic resetting of the phase to a reference value must be used. The resulting sawtooth phase change waveform results in what is termed serrodyne phase modulation of those electromagnetic waves passing through the modulator.

Consider the known resonator fiber optical gyroscope system of FIG. 1. An optical cavity resonator, 10, formed by a continual path optical fiber is provided with an input directional coupler, 11, and an output directional optical coupler, 12. Resonator 10 is formed of a single spatial mode optical fiber which has two polarization eigenstates. Avoiding different optical path lengths for electromagnetic waves in each state is solved by thoroughly mixing the polarized waves in each state or, alternatively, permitting only one polarization eigenstate to exist by use of a polarizer. Such mixing is achieved by fabricating the resonator coil with two ends of a three to fifty meter length of such fiber spliced together so that the birefringence principal axes of the fiber are rotated 90° with respect to each other on opposite sides of the splice, 13. Alternatively, instead of a splice, block 13 can represent a polarizer. The resonator fiber is characterized by a loss coefficient, α, and, if a splice is used, an average of the propagation constants for the principal birefringence axes, $\beta_o$, assuming an ideal 90° splice. If a polarizer is used, the propagation constant will be that of the optical path of the permitted eigenstate of the electromagnetic waves which includes the transmission axis of the polarizer assuming a sufficiently large extinction ratio characterizes its blocking axis.

Directional coupler 11 is fabricated by appropriately fusing together an input optical fiber, 14, with the optical fiber in resonator 10, the fibers being tapered as they come into the fused portion on either side of that portion. Directional coupler provides a phase shift of $\pi/2$ between an input electromagnetic wave and the resulting electromagnetic wave at the resonator output thereof, the output wave further being characterized with respect to the input electromagnetic wave by a coupler coupling coefficient, $k_1$, and a coupler loss coefficient, $\gamma_1$. Directional coupler 11 has a suitable packaging arrangement thereabout.

Directional coupler 12 is constructed in generally the same manner as is directional coupler 11, but here an output optical fiber, 15, is fused to the optical fiber of resonator 10. Directional coupler 12 is characterized by a coupler coupling coefficient, $k_2$, and a coupler loss coefficient, $\gamma_2$.

The opposite ends of input optical fiber 14 are each connected to an optical integrated circuit, 16, formed with lithium niobate (LiNbO$_3$) as the base material therefor. These ends of fiber 14 are appropriately coupled to integrated optical waveguides, 17 and 18, formed in the base material of optical integrated circuit 16. The relationship of the ends of input optical fiber 14 and the ends of integrated waveguides 17 and 18 are such that electromagnetic waves can be efficiently passed therebetween without undue losses. Integrated waveguide 17 is provided between a pair of metal plates formed on the base material of optical integrated circuit 16 to provide a phase modulator, 19, therein. Similarly, integrated waveguide 18 is formed between a another pair of metal plates formed on the base material to result in a further phase modulator, 20, in optical integrated circuit 16. Integrated waveguides 17 and 18 merge with one another into a single integrated waveguide, 21, to thereby provide a "Y" coupler in optical integrated circuit 16.

A laser, 22, is coupled to integrated waveguide 21 in a suitable manner so that light may be transmitted efficiently from laser 22 to integrated waveguide 21. Laser 22 is typically a solid state laser emitting electromagnetic radiation having a wavelength of 1.3 μm with a spectral line width of one to hundreds of Khz. The wavelength at which laser 22 operates, or the frequency thereof, $f_o$, can be adjusted by signals at an input thereof. Typical ways of providing such adjustment is to control the temperature of, or the current through, the solid state laser, or through the "pumping" semiconductor light emitting diode four the solid state laser, which in the latter instance may be a Nd:Yag laser. Where the diode is the emitting laser, the laser type may be an external cavity laser, a distributed feedback laser or other suitable types.

Thus, electromagnetic radiation emitted by laser 22 at a variable frequency $f_o$ is coupled to integrated waveguide 21, and from there split into two portions to form a pair of electromagnetic waves traveling in the input optical path in directions opposite one another. That is, the electromagnetic wave portion transmitted through integrated waveguide 17 proceeds therethrough and past phase modulator 19 into input optical fiber 14, and through input directional coupler 11 where a fraction $k_1$ is continually coupled into resonator 10 to repeatedly travel therearound in a first direction, the counterclockwise directions there being a continual fractional loss for that wave of $\gamma_1$ in coupler 11 as indicated above. The remaining portion of that wave, neither entering resonator 10 nor lost in coupler 11, continues to travel along input optical fiber 14 into integrated optical waveguide 18, through phase modulator 20, and finally through integrated waveguide 21 returning toward laser 22. Usually, laser 22 contains an isolator to prevent such returning waves from reaching the lasing portion thereof so that its properties are unaffected by those returning waves.

Similarly, the electromagnetic wave portion from laser 22, entering integrated waveguide 21 to begin in integrated waveguide 18, passes through phase modulator 20 into input optical fiber 14 and input directional coupler 11 where a fraction $k_1$ thereof is continually coupled into resonator 10, accompanied by a continual fractional loss of $\gamma_1$, to repeatedly traverse resonator 10 in a direction opposite (clockwise) to that traversed by the first portion coupled into resonator 10 described above. The remaining portion not coupled into resonator 10, and not lost in directional coupler 11, continues through input optical fiber 14 into integrated waveguide 17, passing through phase modulator 19, to again travel in integrated waveguide 21 in the opposite direction on its return to laser 22.

The pair of opposite direction traveling electromagnetic waves in resonator 10, a clockwise wave and a counterclockwise wave, each have a fraction $k_2$ continually coupled into output optical fiber 15 with a fraction $\gamma_2$ of each continually lost in coupler 12. The counterclockwise wave is transmitted by coupler 12 and fiber 15 to a corresponding photodetector, 23, and the clockwise wave is transmitted by them to a corresponding photodetector, 24, these photodetectors being positioned at opposite ends of output optical fiber 15. Photodetectors 23 and 24 are typically p-i-n photodiodes each of which is connected in corresponding one of a pair of bias and amplifying circuits, 25 and 26, respectively.

The frequency of the electromagnetic radiation emitted by laser 22, after being split from its combined form in integrated waveguide 21 into separate portions in integrated waveguides 17 and 18, has a resulting portion thereof shifted from frequency $f_o$ to a corresponding resonance frequency by a serrodyne waveform applied to phase modulator 19. The portion of the electromagnetic wave diverted into integrated waveguide 17 is shifted from frequency $f_o$ to frequency $f_o+f_1$ by phase modulator 19, and this frequency shifted electromagnetic wave is then coupled by input directional coupler 11 into resonator 10 as the counterclockwise electromagnetic wave. However, the portion of the electromagnetic wave directed into integrated waveguide 18 from integrated waveguide 21 is not shifted in frequency in the system of FIG. 1, although the frequency thereof could alternatively be similarly shifted from $f_o$ to $f_o+f_2$ by phase modulator 20 in forming the clockwise wave in coil 10. This arrangement would permit having to measure just differences in frequencies between the two serrodyne generators used in such an arrangement to obtain a system output signal rather than the absolute frequency value of a single generator which may be more convenient in some circumstances.

The shifting of frequency of the wave in integrated waveguide 17 is caused by a serrodyne waveform applied to phase modulator 19 as indicated above, the serrodyne waveform for phase modulator 19 being supplied from a controlled serrodyne generator, 27. A similar serrodyne waveform would be applied to modulator 20 by a fixed frequency serrodyne generator if the wave in waveguide 18 was chosen to also be shifted in frequency.

Thus, controlled serrodyne generator 27 provides a sawtooth waveform output signal having a repetitive linear ramp variable frequency $f_1$, the frequency $f_1$ of this sawtooth waveform being controlled by an input shown on the upper side of generator 27 in FIG. 1. The repetitive linear ramp frequency of a sawtooth waveform from another serrodyne generator, if chosen as part of the control for modulator 20, would be fixed as indicated above, and held at a constant value, $f_2$.

Structural detail of controlled serrodyne generator 27 is shown within the dashed line box representing that generator in FIG. 1 as three further blocks. The frequency control input of generator 27 is the input of a voltage-to-frequency converter, 27'. The frequency of the output signal of converter 27', proportional to the voltage at its input, sets the rate of count accumulation in a counter, 27", to which the output of converter 27' is connected. The output count totals of counter 27" are provided to a digital-to-analog converter, 27''', to form a "staircase" waveform to approximate the linear "ramps" occurring in a true serrodyne waveform.

The clockwise electromagnetic wave in resonator 10 and the counterclockwise electromagnetic wave in resonator 10 must always have the frequencies thereof driven toward values causing these waves to be in resonance in resonator 10 for the effective optical path length each is experiencing. This includes the path length variation resulting from any rotation of resonator 10 about the symmetrical axis thereof that is substantially perpendicular to the plane of the loop forming that optical resonator. Since controlled serrodyne generator 27 has the frequency of its serrodyne waveform controlled externally, that frequency value can be adjusted to the point that the corresponding counterclockwise wave in resonator 10 is in resonance with its effective path length, at least in a steady state situation. There, of course, can be transient effects not reflecting resonance in situations of sufficiently rapid changes of rotation rates of resonator 10.

On the other hand, the absence of a sawtooth waveform from another serrodyne generator to form part of the control of modulator 20 as shown in FIG. 1, or the use of a constant frequency for the sawtooth waveform of another serrodyne generator alternatively chosen to form part of the control of modulator 20, requires that the clockwise electromagnetic wave in resonator 10 be adjusted by other means. The means chosen in FIG. 1 is adjusting the frequency value of the light in laser 22. Thus, the adjustment of the value of the frequency $f_1$ of the sawtooth waveform of controlled serrodyne generator 27 can be accomplished independently of the adjustment of the frequency $f_o$ of laser 22 so that, in steady state situations, both the counterclockwise electromagnetic wave and the clockwise electromagnetic wave in resonator 10 can be in resonance therein despite each experiencing a different effective optical path length therein.

Adjusting the frequency of the counterclockwise and clockwise electromagnetic waves traveling in opposite directions in resonator 10 means adjusting the frequency of each of these waves so that they are operating at the center of one of the peaks in the corresponding intensity spectra for resonator 10 experienced by such waves. Maintaining the frequency of the counterclockwise and the clockwise waves at the center of a corresponding resonance peak in the corresponding one of the resonator intensity spectra would be a difficult matter if that peak had to be estimated directly without providing some additional indicator of just where the center of the resonance peak actually is. Thus, the system of FIG. 1 introduces a bias modulation with respect to each of the counterclockwise and clockwise waves in resonator 10 through phase modulators 19 and 20, respectively. Such a bias modulation of each of these waves is used in a corresponding feedback loop to provide a loop discriminant characteristic followed by a signal therein which is acted on by that loop to adjust frequency $f_o$ and $f_1$ as necessary to maintain resonance of the clockwise and counterclockwise waves, respectively.

A bias modulation generator, 28, provides a sinusoidal signal at a frequency $f_m$ to directly control modulator 20. Similarly, a further bias modulation generator, 29, provides a sinusoidal waveform of a frequency $f_n$ which is added to the sawtooth waveform at frequency $f_l$ provided by serrodyne generator 27. Frequencies $f_m$ and $f_n$ differ from one another to reduce the effects of electromagnetic wave backscattering in the optical fiber of resonator 10. The sinusoidal signal provided by bias modulation generator 28 is supplied to a node, 30. The addition of the sinusoidal signal provided by bias modulator generator 29 to the sawtooth waveform provided by serrodyne generator 27 is accomplished in a further summer, 31.

The sinusoidal waveform provided at node 30 is amplified in a power amplifier, 32, which is used to provide sufficient voltage to operate phase modulator 20. Similarly, the combined output signal provided by summer 31 is provided to the input of a further power amplifier, 33, used to provide sufficient voltage to operate phase modulator 19.

In this arrangement, the input electromagnetic wave to resonator 10 from integrated waveguide 17 will have an instantaneous electric field frequency of:

$$f_o + f_l - f_n \Delta\phi \sin\omega_n t$$

The fraction of the electromagnetic wave reaching photodetector 23 through resonator 10 is not only shifted in frequency to a value of $f_o + f_1$, but is also effectively frequency modulated at $f_n$. Depending on the difference between the resonance frequency and $f_o + f_1$, the intensity at that photodetector will thus have variations occurring therein at integer multiples of $f_n$ (though the fundamental and odd harmonics thereof will not occur at exact resonance). These latter components have amplitude factors related to the deviation occurring in the sum of (a) the phase shift resulting from the propagation constant multiplied by the path length in the counterclockwise direction in resonator 10, plus (b) phase shifts due to rotation and other sources, from a value equaling an integer multiple of $2\pi$, a condition necessary for resonance along the effective optical path length in this direction.

The electromagnetic wave in integrated waveguide 18 enroute to resonator 10 will have instantaneous frequency equal to:

$f_o-f_m\Delta\phi\sin\omega_m t$

The fraction thereof reaching photodetector 24 through resonator 10 is at a frequency value in this instance of $f_o$ and frequency modulated at $f_m$. Again, the intensity at photodetector 24 will have variations therein at integer multiples of $f_m$, though not at the fundamental and odd harmonics thereof if these clockwise waves are at exact resonance. These latter components also have amplitude factors related to the deviation of the sum of (a) the phase shift resulting from the propagation constant multiplied by the path length in the clockwise direction in resonator 10, plus (b) phase shifts due to rotation and other sources, from a value equaling an integer multiple of $2\pi$, again, a condition necessary for resonance along the effective optical path length in that direction.

Since the output signal of photodetector 24 has a frequency component at $f_m$ that is a measure of the deviation from resonance in resonator 10 in the clockwise direction, the output signal of bias and amplifier photodetector circuit 24 is provided to a filter, 34, capable of passing signal portions having a frequency component $f_m$. Similarly, the output signal of photodetector 23 has a frequency component at $f_n$ that is a measure of the deviation from resonance in the counterclockwise direction, and so a filter, 35, is provided at the output of photodetector bias and amplifier circuit 25 capable of passing signal components having a frequency of $f_n$.

The output signal from filter 34 is then provided to a phase detector, 36, at an operating signal input thereof. Phase detector 36 is a phase sensitive detector which also receives, at a demodulation signal input thereof, the output signal of bias modulation generator 28 which is the sinusoidal signal at frequency $f_m$. Similarly, the output signal from filter 35 is provided to an operating signal input of a further phase detector, 37, which also receives at a demodulation input thereof the output sinusoidal signal at frequency $f_n$ of bias modulation generator 29. The output signals of phase detectors 36 and 37 follow a loop discriminant characteristic so that they indicate how far from resonance are the corresponding frequencies in resonator 10.

The discriminant characteristic followed by the output of phase detectors 36 and 37 will change algebraic sign for the frequencies on either side of the resonance peak and will have a zero magnitude at the resonance peak or resonance center. In fact, for sufficiently small values of the bias modulation generator output signals, the characteristic followed by the output signals of phase detectors 36 and 37 will be close to the derivative with respect to frequency of the intensity spectrum near the corresponding resonance peak. Thus, the output characteristics followed by the output signals of phase detectors 36 and 37 provide signals well suited for a feedback loop used to adjust frequencies to keep the corresponding electromagnetic waves in resonance in resonator 10.

Errors in the feedback loop are to be eliminated, and so the output signal of phase detector 36 is supplied to an integrator, 38, and the output signal of phase detector 37 is supplied to a further integrator, 39. Deviations from resonance are stored in these integrators which are then used in the loop to force the waves back to resonance in resonator 10. The output signal of integrator 38, in turn, is supplied to an amplifier, 40, used to provide signals to laser 22 to control the frequency $f_o$ of light being emitted by laser 22, thereby closing the feedback loop for adjusting that frequency. Similarly, the output signal of integrator 39 is supplied to an amplifier, 41, which in turn has its outputs supplied to the modulation input of controlled serrodyne generator 27, thus completing the remaining feedback loop to be used for adjusting serrodyne frequency $f_1$.

However, certain errors can arise because of the effects of the propagation characteristics of resonator 10 on the electromagnetic waves oppositely propagating therein which lead to frequency differences therebetween that appear as though they were induced by rotations of resonator 10 about its axis of symmetry perpendicular to the plane in which it is positioned. One source of such error is the nonlinear behavior of the optical fiber material (primarily fused silica glass) in which these electromagnetic waves propagate resulting in differing indices of refraction being experienced by those waves in propagating through resonator 10.

The structure of the fused silica glass in the optical fiber used in resonator coil 10 has been found to give rise to a nonlinear polarization density that can be characterized as being of third order in the electric field. This means the material has a nonlinear dielectric tensor and so nonlinear indices of refraction which can differ for electromagnetic waves propagating in opposite directions through the coil. Thus, the propagation "constants" for the electromagnetic waves propagating in the clockwise and counterclockwise directions through coil 10 will exhibit an added nonlinear term depending on the intensities of the electric fields of the waves traveling therethrough, i.e. the optical Kerr effect. These added terms have been found to be expressible as:

$$\Delta\beta_{Kcw}(t,z) = \frac{2\omega_0 n_{eff} n_2}{cA} [I_{cw}(t,z) + 2I_{ccw}(t,z)]$$

$$\Delta\beta_{Kccw}(t,z) = \frac{2(\omega_0 + \omega_1) n_{eff} n_2}{cA} [I_{ccw}(t,z) + 2I_{cw}(t,z)]$$

where $\Delta\beta_{Kcw}(t,z)$ is the change in propagation "constant" for the clockwise electromagnetic wave in resonator coil 10, and $\Delta\beta_{Kccw}(t,z)$ is the change in the propagation "constant" for the counterclockwise traveling electromagnetic wave as a function of the distance travelled through coil 10 represented by z. The intensity $I_{cw}(t,z)$ is the intensity at a time t and position z along coil 10 of the clockwise wave, and the intensity $I_{ccw}(t,z)$ is the similar intensity for the counterclockwise wave traveling along coil 10. The Kerr coefficient is $n_2$, and A represents the area of a cross section of the fiber in which the electromagnetic waves propagating therethrough are concentrated, with c being the speed of light in a vacuum.

As can be seen, the values of these last two expressions is different if $I_{cw} \neq I_{ccw}$ indicating that differences in these added propagation "constant" terms can occur only upon differences occurring in the intensities of the clockwise and counterclockwise waves propagating in coil 10. Such differences in intensity are difficult if not impossible to avoid in practice, and so different propagation constants will be experienced by each of the counter-propagating waves in that coil, a situation which has been found to lead to corresponding resonant frequency differences between these waves which do not differ in nature from the resonant frequency differences arising from rotations of this coil. Hence, such nonlinear material behavior leads to errors in the output of the system of FIG. 1.

The nature of such errors arising because of the occurrence of these nonlinear terms in the propagation "constants" for electromagnetic waves in coil 10 can be found using a suitable representation for these waves propagating in coil 10. One such representation that can be shown to be suitable for the clockwise wave is given as follows:

The parameter $\Delta\beta = 2\pi n_{eff} f_m \Delta\phi_m/c$ is the equivalent change in the effective propagation constant due to the incoming electromagnetic waves having been modulated sinusoidally at the rate $\omega_m$ with a peak amplitude change of $\Delta\phi_m$. The parameter $\pm\phi_r$ represent the Sagnac phase shift induced by rotation in one direction or another about the axis symmetry of resonator 10 perpendicular to a plane passing through all of that resonator. The coefficient $\alpha$ is the coefficient giving the loss $$E_{cw}(t,z) = \sqrt{1-\gamma_1}\, i\sqrt{k_1}\, qE_{in}e^{i(\omega_o t + \Delta\phi_m\cos\omega_m t)} \times$$

$$\left[\sum_{u=0}^{\infty} (\sqrt{1-\gamma_1}\,\sqrt{1-k_1}\,\sqrt{1-\gamma_2}\,\sqrt{1-k_2}\, e^{-\frac{\alpha L}{2}})^u \times \right.$$

$$\left. e^{-i(\beta_o - \Delta\beta_m\sin\omega_m t)Lu} e^{-i(\pm\phi_r + \theta + \theta_{Kcw})u}\right] e^{-\frac{\alpha z}{2}} \quad \text{for } 0 \leq z \leq l_1$$

$$= \sqrt{1-\gamma_1}\, i\sqrt{k_1}\, qE_{in}e^{i(\omega_o t + \Delta\phi_m\cos\omega_m t)} \times$$

$$\left[\sum_{u=0}^{\infty} (\sqrt{1-\gamma_1}\,\sqrt{1-k_1}\,\sqrt{1-\gamma_2}\,\sqrt{1-k_2}\, e^{-\frac{\alpha L}{2}})^u \sqrt{1-\gamma_2}\,\sqrt{1-k_2} \times \right.$$

$$\left. e^{-i(\beta_o - \Delta\beta_m\sin\omega_m t)Lu} e^{-i(\pm\phi_r + \theta + \theta_{Kcw})u}\right] e^{-\frac{\alpha z}{2}} \quad \text{for } l_1 \leq z \leq L$$

where z has a value of zero at the output of coupler 11 for clockwise waves, a value of 11 at the input to coupler 12 for clockwise waves, and a value of L at the input to coupler 11 for clockwise waves with the couplers assumed to have no significant extent along the z path. Thus, the distance from coupler 11 to coupler 12 not passing through splice (or polarizer) 13 is $l_1$, and the distance from coupler 12 to coupler 11 through splice (or polarizer) 13 is $l_2$ with $L = l_1 + l_2$.

The effective propagation "constant" in the foregoing equation, $\beta_{cw}$, gives the effective phase change per unit length along coil 10, and comprises a pair of terms, that is $\beta_{cw} = \beta_o - \Delta\beta_m\sin\omega_m t$. The term $\beta_o = 2\pi n_{eff} f_o/c$ is the weighted average of the propagation constants of the two principle axes of birefringence of the optical fiber in resonator 10 if a splice 13 has been used. This average is based on the fraction of travel over each axis by the electromagnetic waves in the resonator in the corresponding polarization state with changes between axes being due to the 90° rotation splice in the optical fiber of that resonator as described above. A rotation of other than 90° will give an uneven weighting to these axes. If, on the other hand, a polarizer is used rather than a splice at block 13, there will be only single propagation constants as $n_{eff}$ will no longer be an average of indices of refraction but a single value index refraction (ignoring other index of refraction issues). Again, the parameter $\theta$ in the above equations for $E_{cw}$ reflects any added phase due to the 90° splice, or near 90° splice, involving block 13 if present rather than a polarizer.

per unit length in the resonator optical fiber of coil 10. The factor q represents the division of the electromagnetic wave from laser 22, $E_{in}$, due to the splitting of that wave by "y" coupler 21 and also the losses for that wave accumulated on the way to input directional coupler 11. Of course, $\omega_o = 2\pi f_o$, or the frequency of oscillation in the electromagnetic wave provided by laser 22. The parameter u is the counting parameter of the number of circulations about coil 10 by the electromagnetic waves. Finally, the parameter $\theta_{Kcw}$ represents the phase change for one round trip through coil 10 in the electromagnetic waves in the clockwise direction due to the Kerr effect.

Although the last equation is indeed just for the clockwise traveling electromagnetic wave in resonator 10 that began in integrated optical waveguide 18, the counterpart equation for waves beginning in integrated waveguide 17 and traveling in the opposite or counterclockwise direction in resonator 10 will be quite similar and so is not separately set forth here. Such counterclockwise waves will, however, have the opposite sign for any rotation induced phase shift and will have a slightly different propagation "constant" $\beta$ because of the frequency shifts due to the use of serrodyne generator 27. Thus, $\beta_{ccw} = \beta_{o-1} - \Delta\beta_n\sin\theta_n t$. Then, $\beta_{o-1} = 2\pi n_{eff}(f_o + f_1)/c$ and $\Delta\beta_n = 2\pi n_{eff} f_n \Delta\phi_n/c$ where $\Delta\phi_n$ is the peak amplitude of the bias modulation sinusoid.

From the foregoing equation for $E_{cw}$, and from the counterpart equation for $E_{ccw}$ not set out here, the intensities associated with these propagating electromagnetic waves, $I_{cw}(t, z)$ and $I_{ccw}(t, z)$ can be found. Thus, $$I_{cw}(t,z) = E_{cw} \cdot E_{cw}^* = (1-\gamma_1)k_1 q^2 E_{in}^2 e^{-\alpha z} \times$$

$$\left| \frac{1}{1 - (\sqrt{1-\gamma_1}\,\sqrt{1-k_1}\,\sqrt{1-\gamma_2}\,\sqrt{1-k_2}\, e^{-\frac{\alpha L}{2}}) e^{-i(\beta_o - \Delta\beta_m\sin\omega_m t)L} e^{-i(\pm\phi_r + \theta + \theta_{Kcw})}} \right|^2$$

-continued $$= |t|^2 q^2 E_{in}^2 e^{-\alpha z} \frac{1}{(1-R)^2 + 4R\sin^2\left(\frac{\Delta_{cw} + \theta_{Kcw}}{2}\right)} \quad \text{for } o \leq z \leq l_1$$

where $$t \quad \sqrt{1-\gamma_1} \; i\sqrt{k_1} \; ; R \quad \sqrt{1-\gamma_1} \; \sqrt{1-\gamma_2} \; \sqrt{1-k_1} \; \sqrt{1-k_2} \; e^{-\frac{\alpha L}{2}}$$

and $$\Delta_{cw} \quad \beta_o L - \Delta\beta_m L \sin\omega t + \phi_r + \theta = \beta_{cw} L + \phi_r + \theta.$$

Similarly, $$I_{cw}(t,z) = |t|^2 (1-\gamma_2)(1-k_2) q^2 E_{in}^2 e^{-\alpha z} \times$$

$$\frac{1}{(1-R)^2 + 4R\sin^2\left(\frac{\Delta_{cw} + \theta_{Kcw}}{2}\right)} \quad \text{for } l_1 < z \leq L$$

The well known limit for the infinite geometric series has been used in obtaining these equations for the clockwise intensity as has the well known Euler equation.

In a similar manner, the counterclockwise intensity is found $$I_{ccw}(t,z) = E_{ccw} \cdot E_{ccw}^* = |t|^2 p^2 E_{in}^2 e^{-\alpha(L-z)} \times$$

$$\frac{1}{(1-R)^2 + 4R\sin^2\left(\frac{\Delta_{ccw} + \theta_{Kccw}}{2}\right)} \quad \text{for } l_1 < z \leq L$$

where p represents the split of $E_{in}$ going into waveguide 17 as well as the losses accumulated propagating to directional input coupler 11, and where $$\Delta_{ccw} = \beta_{0-1} L - \Delta\beta_n L \sin\omega_n t - \phi_r + \theta = \beta_{ccw} L - \phi_r + \theta$$

Here, $\theta_{Kccw}$ represents the phase change in resonator coil 10 for one passage of the counterclockwise electromagnetic wave therethrough due to the optical Kerr effect. Also, $$I_{ccw}(t,z) = |t|^2 (1-\gamma_2)(1-k_2) p^2 E_{in}^2 e^{-\alpha(L-z)} \times$$

$$\frac{1}{(1-R)^2 + 4R\sin^2\left(\frac{\Delta_{ccw} + \theta_{Kccw}}{2}\right)} \quad \text{for } o \leq z \leq l_1$$

These equations can be further consolidated by appropriate substitutions based on the following definition which will be made further along in this text:

$$\Gamma(x) = \frac{1}{(1-R)^2 + 4R\sin^2\left(\frac{x}{2}\right)} = \frac{1}{1 + R^2 - 2R\cos x},$$

making use of a trigonometric identity.

These intensity equations can then be used to evaluate $\theta_{Kcw}$ since the clockwise Kerr effect phase error can be found by integrating the change in the propagation "constants" due to the Kerr effect over the optical path through resonator coil 10, or $$\theta_{Kcw} = \int_o^{l_1} \Delta\beta_{Kcw}(t,z)dz + \int_{l_1}^{L} \Delta\beta_{Kcw}(t,z)dz$$

From the equation above for $\Delta\beta_{Kcw}(t, z)$, this last expression can be rewritten as $$\theta_{Kcw} = \frac{2\omega_0 n_{eff} n_2}{cA} \int_o^{l_1} [I_{cw}(t,z) + 2I_{ccw}(t,z)]dz +$$

$$\frac{2\omega_0 n_{eff} n_2}{cA} \int_{l_1}^{L} [I_{cw}(t,z) + 2I_{ccw}(t,z)]dz$$

The integrals involved in this last expression can be evaluated and shown to be $$\frac{2\omega_0 n_{eff} n_2}{cA} \int_o^{L} I_{cw}(t,z)dz = \frac{2\omega_0 n_{eff} n_2}{cA} \left\{ \frac{1 - [1 - (1-\gamma_2)(1-k_2)]e^{-\alpha l_1} - (1-\gamma_2)(1-k_2)e^{-\alpha L}}{\alpha} \right\} \times |t|^2 q^2 E_{in}^2 \Gamma(\Delta_{cw} + \theta_{Kcw})$$

$$\frac{2\omega_0 n_{eff} n_2}{cA} \int_o^{L} 2I_{ccw}(t,z)dz = \frac{4\omega_0 n_{eff} n_2}{cA} \left\{ \frac{1 - [1 - (1-\gamma_2)(1-k_2)]e^{-\alpha(L-l_1)} - (1-\gamma_2)(1-k_2)e^{-\alpha L}}{\alpha} \right\} \times |t|^2 q^2 E_{in}^2 \Gamma(\Delta_{ccw} + \theta_{Kccw})$$

These expressions for the integrals can be simplified by introducing $l_1 = L/2$, which is typically the situation occurring in the system of FIG. 1 although not a required condition for successful operation of the system. If that introduction is made, the terms in the brackets in the evaluations of the above integrals will be equal allowing the expression for the $\theta_{Kcw}$ to be written as:

$$\theta_{Kcw} = \delta I_o [q^2 \Gamma(\Delta_{cw} + \theta_{Kcw}) + 2p^2 \Gamma(\Delta_{ccw} + \theta_{Kccw})]$$

where $$I_o = E_{in}^2$$

and $$\delta = \frac{2\omega_o n_{eff} n_2}{cA} |t|^2 \left\{ \frac{1 - [1 - (1 - \gamma_2)(1 - k_2)]e^{-\frac{aL}{2}} - (1 - \gamma_1)(1 - k_2)e^{-aL}}{a} \right\}$$

In a similar manner, $\theta_{Kccw}$ can be found to be $$\theta_{Kccw} = \delta I_0[p^2\Gamma(\Delta_{ccw}+\theta_{Kccw})+2q^2\Gamma(\Delta_{cw}+\theta_{Kcw})]$$

As indicated above, the clockwise traveling electromagnetic wave portion reaching photodiode 24, $I_{cw-d}$, will have the frequency thereof controlled in the feedback loop operating laser 22 to set the value $f_o$ to keep that electromagnetic wave in resonance in resonator coil 10 in steady state conditions. This is accomplished in the feedback loop for laser 22 by forcing any bias modulation frequency component at the bias modulation frequency $\omega_m$ in $I_{cw-d}$ to zero through shifting the value of $f_o$ sufficiently for the clockwise wave to be in resonance. Such feedback action yields a clockwise wave intensity at photodiode 24 of $$I_{cw-d} =$$

$$(1 - \gamma_1)(1 - \gamma_2)(1 - k_1)(1 - k_2)q^2 I_o e^{-\frac{aL}{2}} \Gamma(\Delta_{cw} + \theta_{Kcw})$$

In such a resonance condition, the total phase change of the clockwise wave over the optical path through the resonator optical fiber coil 10, $\Delta_{cw}+\theta_{Kcw}$, must equal an integral number of cycles to be able to stably reproduce itself over that path. The parameter $\theta_{Kcw}$ is the time average value of the Kerr effect phase change $\theta_{Kcw}$.

This resonance condition can be expressed as $\beta_o L \pm \phi_r + \theta_{Kcw} = 2m\pi$ assuming use of polarizer for block 13 (otherwise the splice angle $\theta$ must be included).

In a similar manner, the portion of the counterclockwise wave in resonator coil 10 impinges on photodiode 23, and the feedback loop beginning therefrom to control serrodyne generator 27 adjusts the frequency of the counterclockwise wave, $\omega_o + \omega_1$, to keep that wave in resonance in resonator optical fiber coil 10 in steady state conditions. Again, this is accomplished in this feedback loop through forcing to zero any bias modulation signal frequency component at bias modulation frequency $\omega_n$ in the counterclockwise wave intensity $I_{ccw-d}$ on photodiode 23 giving the result $$I_{ccw-d} =$$

$$(1 - \gamma_1)(1 - \gamma_2)(1 - k_1)(1 - k_2)p^2 I_o e^{-\frac{aL}{2}} \Gamma(\Delta_{ccw} + \theta_{Kccw})$$

In these circumstances at the resonance condition, again the phase change in the counterclockwise direction in the optical path in coil 10, $\Delta_{ccw}+\theta_{Kccw}$, for the counterclockwise electromagnetic wave must be an integral number of cycles for stable reproduction of that wave over that path. This condition can be expressed as $\beta_{o-1}L \pm \phi_r + \theta_{Kccw} = 2m\pi$, assuming use of a polarizer for block 13, where again m is an integer and $\theta_{Kccw}$ is the time average value of the Kerr effect phase change over that optical path.

These two resonance conditions in the preceding paragraphs are, as indicated, maintained during steady state conditions in the system of FIG. 1. Thus, any changes in any of the terms in these resonance condition equations must balance one another if those conditions are to be maintained. As a result, the following conditions must also hold:

$$\overline{\Delta_{cw}+\theta_{Kcw}}=o; \quad \overline{\Delta_{ccw}+\theta_{Kccw}}=o$$

The bar over the top of the symbols used again denotes that the time average value is taken. The effects in $\phi_r$, $\theta_{Kcw}$ and $\theta_{Kccw}$ of the harmonics of the modulation frequencies in the signals at photodiodes 23 and 24 are so much smaller than both $2\pi$ and the amplitudes of the bias modulations $\Delta\phi_m$ and $\Delta\phi_n$ that they may be ignored.

Using these last two equations, and the expressions found above for $\theta_{Kcw}$ and $\theta_{Kccw}$, gives the result:

$$\Delta_{cw}=-\delta I_o[q^2\Gamma(\Delta\beta_m L\sin\omega_m t)+2p^2\Gamma(\Delta\beta_n L\sin\omega_n t)]$$

$$\Delta_{ccw}=-\delta I_o[p^2\Gamma(\Delta\beta_n L\sin\omega_n t)+2q^2\Gamma(\Delta\beta_m L\sin\omega_m t)]$$

Thus, under the bias modulations over the resonances at bias modulation frequencies $\omega_m$ and $\omega_n$, the time average change in phase in the clockwise direction from resonance set by the bias modulation feedback loops, $\Delta_{cw}$, equals the time average change in phase over the optical path due to the presence of the optical Kerr effect. This time average phase change due to the Kerr effect occurs because the bias modulation signal amplitudes affect the time average intensity in the resonator differently in each propagation direction in resonator 10. This result, in turn, causes the feedback loops to maintain optical frequencies that are not due to the rotation rate of resonator 10 alone, but that are also due to the presence of the optical Kerr effect thus leading to error. This situation is also true of the time average change in phase from resonance in the counterclockwise direction, $\Delta_{ccw}$, set by these loops. These last two expressions would otherwise be zero in the absence of the Kerr effect.

As is well known, the frequency difference between the clockwise and counterclockwise electromagnetic waves in resonator coil 10 for a rotation rate $\Omega$ is given by:

$$\Delta f = \frac{4A}{n_{eff}\lambda P} \Omega$$

where A is the area enclosed by resonator coil 10, P is the perimeter of that area, and $\lambda$ is the wavelength of the center of the spectrum of the electromagnetic waves emitted by source 11. Thus, the effective rotation rate error due to the Kerr effect, $\Omega_{Ke}$, can be written:

$$\Omega_{Ke} = \frac{n_{eff}\lambda P}{4A} \Delta f_{Ke}$$

where $\Delta f_{Ke}$ here is the resonant frequency difference between the clockwise and counterclockwise waves due to the optical Kerr effect. This frequency difference is equal to the total phase difference which occurs between the clockwise and counterclockwise waves around the perimeter of ring 10 because of the Kerr effect, $\Delta_{cw} - \Delta_{ccw}$, divided by $2\pi$ giving the number of amplitude wave cycles over this perimeter, divided by the time of propagation over this perimeter $n_{eff}P/c$, i.e. $\Delta f_{Ke} = (\Delta_{cw} - \Delta_{ccw}/2\pi)c/n_{eff}P$.

Thus, the expression above for the rotation rate error due to the Kerr effect $\Omega_{Ke}$ can be rewritten using the expression therefor given above, and this last expression along with the above expressions for $\Delta_{cw}$ and $\Delta_{ccw}$ to give the following result:

$$\Omega_{Ke} = \frac{\lambda c}{8\pi A} \delta I_o [q^2 \Gamma(\Delta\beta_m L \sin\omega_m t) - p^2 \Gamma(\Delta\beta_n L \sin\omega_n t)]$$

Therefore, the rotation rate error $\Omega_{Ke}$ can be evaluated by finding values for the two time averages occurring therein, or $$\Gamma(\Delta\beta_m L \sin\omega_m t) = \frac{1}{T} \int_0^T \frac{1}{1 + R^2 - 2R\cos\Delta\beta_m L\sin\omega_m t} dt =$$

$$\frac{1}{(1-R)\sqrt{(1-R)^2 + R(\Delta\beta_m L)^2}}$$

$$\Gamma(\Delta\beta_n L \sin\omega_n t) = \frac{1}{T} \int_0^T \frac{1}{1 + R^2 - 2R\cos\Delta\beta_n L\sin\omega_n t} dt =$$

$$\frac{1}{(1-R)\sqrt{(1-R)^2 + R(\Delta\beta_n L)^2}}$$

The integrals in these last expressions have been evaluated using a small angle approximation based on the amplitude of the phase changes due to the bias modulations being relatively small. If it is also assumed, as is typical, that the difference between the phase change amplitudes of the bias modulations are small, or $$\Delta\beta_m \approx \Delta\beta_n$$

and the following definition is made $$\Delta\beta \quad \frac{\Delta\beta_m + \Delta\beta_n}{2},$$

then $$\frac{\Delta\beta_m - \Delta\beta_n}{2} << \Delta\beta$$

In these circumstances, the rotational error rate due to the optical Kerr effect becomes:

$$\Omega_{Ke} = \frac{\lambda c}{8\pi A} \frac{\delta I_o}{(1-R)\sqrt{(1-R)^2 + R(\Delta\beta L)^2}}$$

$$\left\{(q^2 - p^2) - \frac{R\Delta\beta L^2(p^2 + q^2)}{(1-R)^2 + R(\Delta\beta L)^2} \left(\frac{\Delta\beta_m - \Delta\beta_n}{2}\right)\right\}$$

This result for the rotational rate error due to the Kerr effect can be written in simplified form by the introduction of two constants, $c_1$ and $c_2$, defined as follows:

$$c_1 \quad \frac{\lambda c \delta}{8\pi A(1-R)\sqrt{(1-R)^2 + R(\Delta\beta L)^2}}$$

and $$c_2 \quad \frac{R\Delta\beta L}{2[(1-R)^2 + R(\Delta\beta L)^2]}.$$

Then the expression above for the rotational rate error due to the Kerr effect can be written as:

$$\Omega_{Ke} = c_1 I_o\{(q^2 - p^2) - c_2(\Delta\beta_m - \Delta\beta_n)L(p^2 + q^2)\}.$$

Thus, the rotational rate error due to the Kerr effect can be seen to depend linearly on the input intensity of the electromagnetic waves provided by laser 22. In addition, the error can be seen to arise because of unequal counter-rotating electromagnetic waves due to unequal fractions p and q of the input waves being converted to such counter-rotating waves at integrated waveguide junction 21 providing a "Y" coupler in optical integrated circuit 16, compounded by any inequalities in the bias modulation amplitudes and frequencies resulting in unequal corresponding modulation propagation "constants" $\Delta\beta_m$ and $\Delta\beta_n$. In practice, such inequalities are often, if not usually, unavoidable so that resultant Kerr effect errors are present.

To achieve suitable accuracy in a resonator fiber optic gyroscope in many applications, such errors must be substantially reduced or eliminated. One manner of correcting errors of this nature has been set out in the U.S. Pat. No. 4,673,293 to Sanders. There, feedback has been used to alter the intensity of one of the propagating electromagnetic waves to force an error signal based on errors of the foregoing nature towards the value of zero. However, this arrangement requires use of an intensity modulator in the path of one of the counter-propagating electromagnetic waves to effect control thereof. A modulator of that type of sufficient capability is typically expensive because of the difficulties in fabricating one suitable for the intended use. Therefore, there is a desire to provide a fiber optic gyroscope which overcomes the present errors due to the Kerr effect in an alternative manner.

SUMMARY OF THE INVENTION

The present invention provides an error compensator for compensating rotation rate errors arising because of an optical Kerr effect occurring in a coiled optical fiber in a rotation sensor capable of sensing rotation about an axis of the coiled fiber, formed in the closed optical path, and having a coupler connected thereto to permit electromagnetic waves to be coupled between this coiled optical fiber and an external optical fiber. Rotation is sensed based on having a pair of electromagnetic waves traveling through the coiled optical fiber in opposing directions to each impinge on a corresponding one of a pair of photodetectors. At least one of these opposing waves is subject to having its phase varied by selected signals supplied to an input of the phase modulator, and with the photodetector receiving that wave providing an output signal in response thereto that is representative of that wave. A controlled frequency adjustment signal generator provides an output signal to the phase modulator at a selected operation frequency. A signal component selector extracts a desired signal component from the photodetector output signal and provides a signal based thereon to said controlled frequency adjustment signal generator to select a frequency of operation therefor. An amplitude modulation signal generator operates to provide an amplitude modulation component in the opposing electromagnetic waves in the coiled optical fiber. A compensator extracts a plurality of differing characteristics from the first photodetector signal and combines them in a manner so as to result in a determination of substantially the rotation rate error due to the optical Kerr effect occurring in the coiled optical fiber. This determination can be used to compensate an output signal for the system to result in an output signal substantially free of such kind of errors.

The controlled frequency adjustment signal generator typically has an output waveform that essentially follows the serrodyne waveform. An integrator may be included in the signal component selector ahead of its connection to the controlled frequency adjustment signal generator to eliminate errors. Electromagnetic waves in the resonator coil may reach the corresponding photodetector either through the coupler initially described, or through a second coupler also connected to the coiled optical fiber to couple electromagnetic waves between it and another external optical fiber.

BRIEF DESCRIPTION OF THE DRAWINGS

FIG. 3 shows a system schematic diagram of a further resonator fiber optical gyroscope system also embodying the present invention combining a signal processing arrangement and an optical transmission path and device arrangement.

DETAILED DESCRIPTION OF THE PREFERRED EMBODIMENTS

Figure 1:
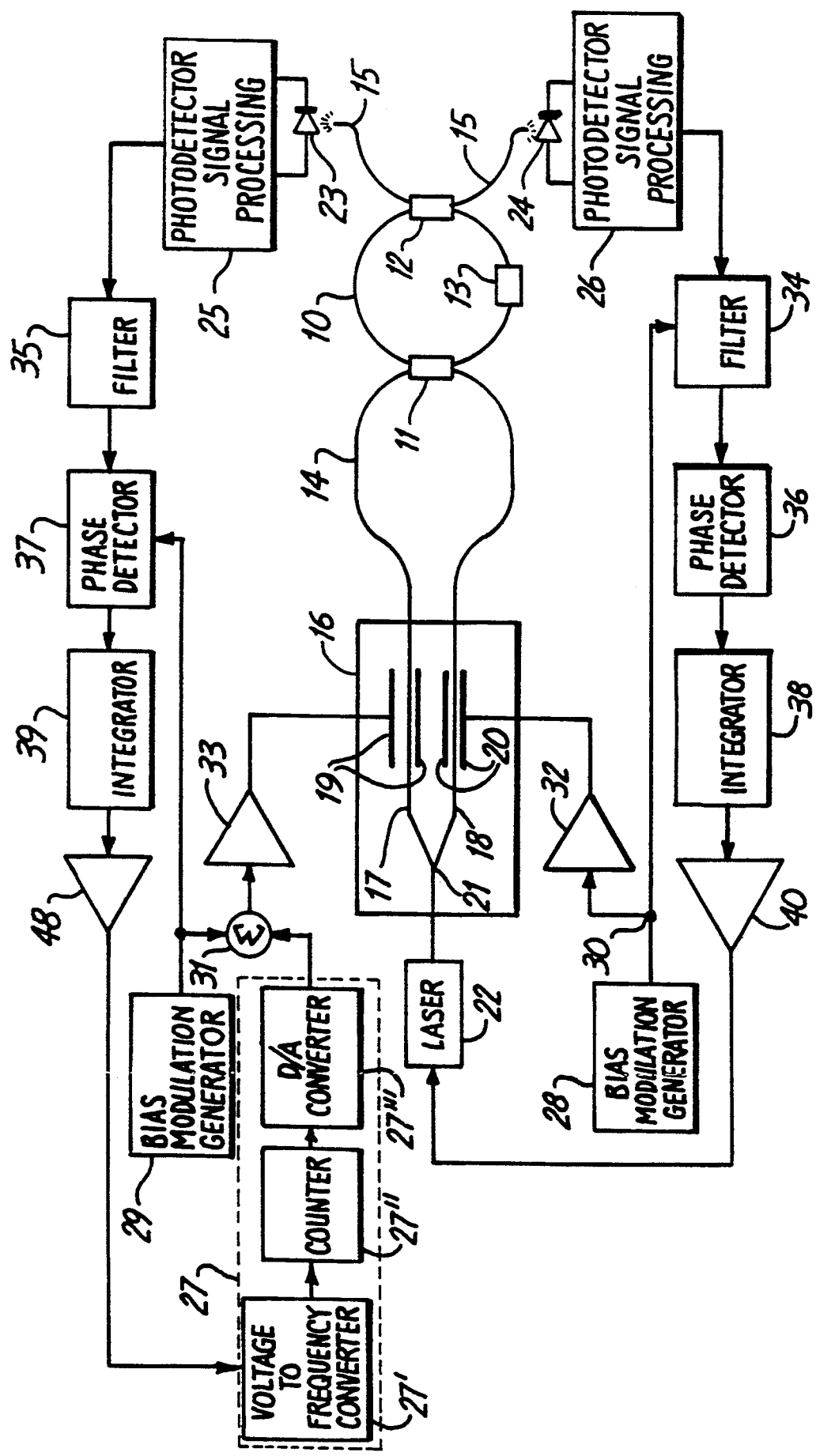
FIG. 1 shows a system schematic diagram of a resonator fiber optical gyroscope system known in the prior art combining a signal processing arrangement and an optical transmission path and device arrangement.
Figure 2A:
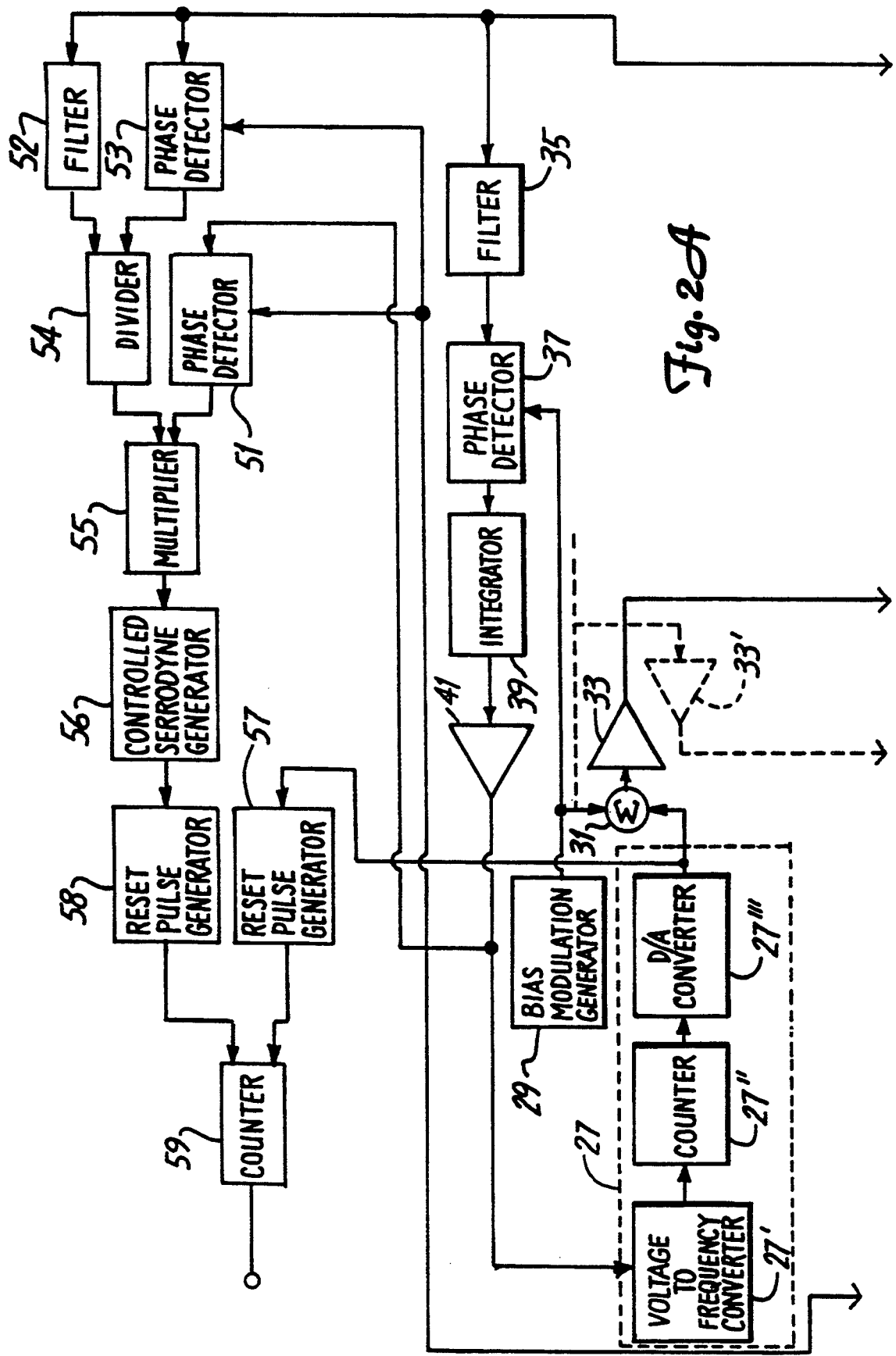
FIGS. 2A and 2B show a system schematic diagram of a resonator fiber optical gyroscope system embodying the present invention combining a signal processing arrangement and an optical transmission path and device arrangement.
Figure 2B:
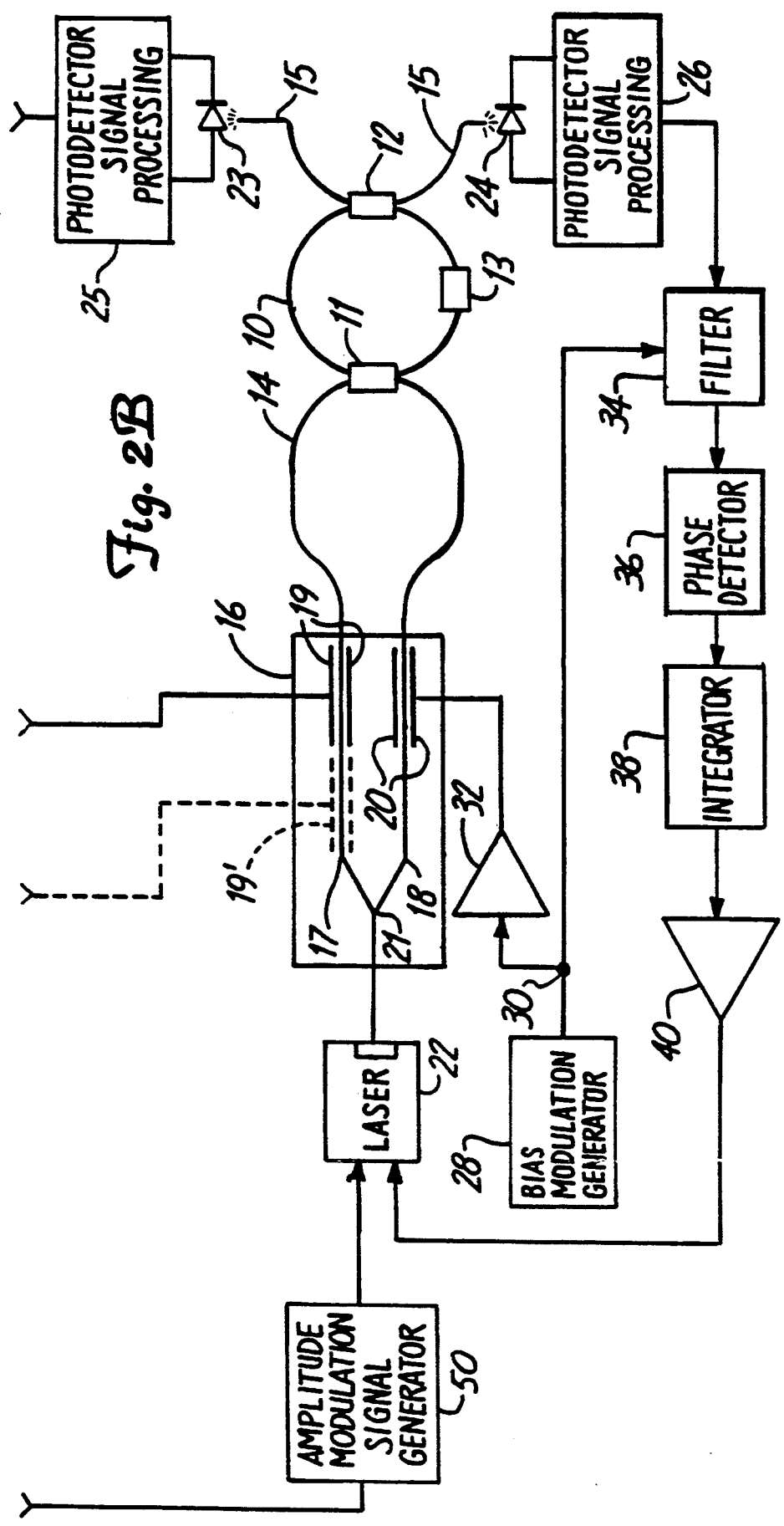
Figure 9:
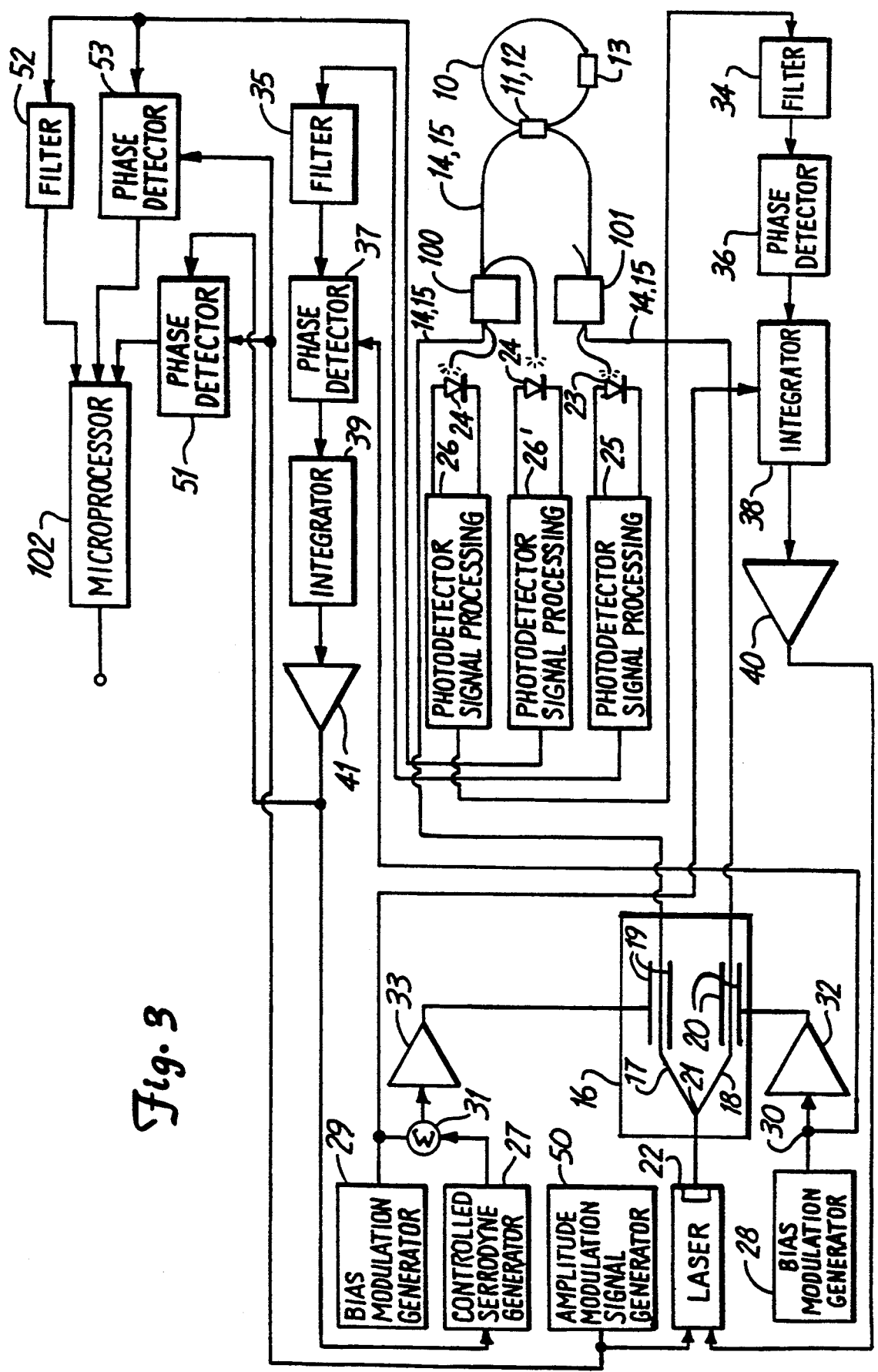

FIGS. 2A and 2B show an embodiment of the present invention in which a compensation arrangement has been added to the system shown in FIG. 1 to provide an output signal representing the rotation rate of the sensor with errors otherwise present therein, due to the optical Kerr effect, having been substantially reduced or eliminated. Designations used for the various devices, transmission paths and blocks in FIG. 2 are the same as those which were used in FIG. 1 for the corresponding items shown there.

An alternative is shown in FIGS. 2A and 2B that was not shown in FIG. 1 by which summer 31 can be eliminated through use of another phase modulator, 19', shown in dashed line form in integrated optic chip 16 in FIG. 2B. In this situation, the output of controlled serrodyne generator 27 would be directly connected to the input of amplifier 33 with summer 31 eliminated. The output of bias modulator generator 29 in this arrangement follows the dashed line interconnection arrangement shown in FIG. 2A by first being connected to the input of another amplifier 33', to supply the necessary voltage to operate phase modulator 19'. The output of amplifier 33' in FIG. 2A is connected by a dashed line to phase modulator 19' of FIG. 2B so that the electromagnetic waves passing therethrough are phase modulated in accordance with the signal provided by generator 29.

The rotation rate error $\Omega_{Ke}$ due to the Kerr effect in the portion of the system in FIGS. 2A and 2B common to FIG. 1 (or dashed line alternative), given above for FIG. 1 as $$\Omega_{Ke}=C_1 I_o\{(q^2-p^2)-C_2(\Delta\beta_m-\Delta\beta_n)L(p^2+q^2)\},$$

is, as previously indicated, linear with respect to the input electromagnetic wave intensity, $I_o$. In these circumstances, any changes occurring in the optical Kerr effect rotation rate error because of corresponding changes in the input intensity will also be linearly related, or $$\Delta\Omega_{Ke}=C_1\{(q^2-p^2)-C_2(\Delta\beta_m-\Delta\beta_n)L(p^2+q^2)\}\Delta I_o,$$

where $\Delta\Omega_{Ke}$ is the optical Kerr effect rotation rate error change and $\Delta I_o$ is the wave intensity change. Hence, taking the ratio of these last two equations yields:

$$\frac{\Delta\Omega_{Ke}}{\Omega_{Ke}} = \frac{\Delta I_o}{I_o},$$

Hence, if a change in input intensity $I_o$ is forced to occur through amplitude modulating that intensity to cause a change $\Delta I_o$ therein, the rotational rate error due to the optical Kerr effect $\Omega_{Ke}$ can be found if the corresponding change in that error $\Delta\Omega_{Ke}$ can be determined along with the values of $I_o$ and $\Delta I_o$. Once $\Omega_{Ke}$ is so determined, the output system signal can be compensated for the amount of the error found.

Thus, an amplitude modulation signal generator, 50, is provided in FIG. 2B connected to laser apparatus 22 for the purpose of amplitude modulating the electromagnetic waves provided by laser 22 to the input waveguide in integrated optics chip 16 at a modulation frequency $f_{am}$, typically in the one to few kHz range using a sinusoidal waveform. Any suitable electromagnetic wave modulation apparatus can be used in laser 22 for this purpose: a typical arrangement would be to have a signal from generator 50 modulate the current flow through the laser diode.

The frequency difference between the counter-propagating electromagnetic waves in coil 10 in FIGS. 1 and 2 is supplied by controlled serrodyne generator 27 through amplifier 33 and phase modulator 19. That frequency difference in the presence of optical Kerr effect based rotational rate errors is equal to $\Delta f \Delta f_{fKe} + \Delta f_{Ke}$ where $\Delta f_{fKe}$ is the frequency difference component free of any Kerr effect errors, such as would come about because of any rotation of coil 10 about the axis perpendicular to its plane, and $\Delta f_{Ke}$ is the frequency difference component due to any optical Kerr effect errors. From the discussion above, these components are each related to a rotation rate which is more or less the actual rotation rate for the error free component and the erroneous rotation rate for the Kerr effect error component, or $$\Delta f_{fKe} = \frac{4A}{n_{eff}\lambda P} \Omega; \Delta f_{Ke} = \frac{4A}{n_{eff}\lambda P} \Omega_{Ke}.$$

Since controlled serrodyne generator 27 is a substantially linear converter of input voltage to output frequency with a conversion factor having a value here designated h, the input voltage to converter 27 can be written:

$$v_{27}=h\Delta f=v_{27-fKe}+v_{27-Ke}$$

where $$v_{27-fKe} = h\Delta f_{Ke}; \quad v_{27-Ke} = h\Delta f_{Ke}.$$

The input voltage component for generator 27 due to the optical Kerr effect, $v_{27-Ke}$, must vary with the modulation of the intensity of laser 22 since it varies with $\Delta fKe$ which was shown in the equation preceding that equation giving $v_{27}$ to vary with $\Omega_{Ke}$. Thus, since changes in $\Omega_{Ke}$, or $\Delta\Omega_{Ke}$, were shown to be related to changes in the input electromagnetic wave intensity $\Delta I_o$, $v_{27-Ke}$ must vary with $\Delta I_o$. This variation will be sinusoidal if generator 50 is assumed to provide a sinusoidal signal to in turn cause a sinusoidal modulation of the intensity output of laser 22 (but other modulation waveforms could be used). Thus, $V_{27-Ke}$ can be written as:

$$v_{27-Ke} = \overline{v}_{27-Ke} + \Delta v_{27-Ke}(f_{am}) = h\Delta f_{Ke} = h\Delta \overline{f}_{Ke} + h\Delta(\Delta f_{Ke})$$

where $\overline{v}_{27-Ke}$ is a term having a value not depending on the modulation, $\Delta v_{27-Ke}$ is a term which varies with the modulation of laser 22 at frequency $f_{am}$, and $\Delta(\Delta f_{Ke})$ represents the change in the optical Kerr effect frequency difference component because of the amplitude modulation of the intensity of the electromagnetic waves emitted by laser 22. From the foregoing, $\Delta v_{27-Ke}$ can be written $$\Delta V_{27-Ke}(f_{am}) = h\Delta(\Delta f_{Ke}) = \frac{h4A}{n_{eff}\lambda P}\Delta\Omega_{Ke}$$

A signal representing the amplitude of this modulation frequency component of the input voltage applied to the input of controlled serrodyne generator 27 can be recovered by selecting that frequency component out of that input signal through supplying it to the signal input of a phase sensitive detector having a reference signal of frequency $f_{am}$ supplied to its reference input. In this situation, the value of $f_{am}$ provide by generator 50 in the system of FIG. 2B must be chosen to be much less than the value of frequency $f_n$ provided by bias modulation generator 29 if the amplitude modulation process is to avoid interfering with the bias modulation arrangement, particularly since the amplitude modulation signal must be recovered from the signal based on the frequency component $f_n$ already recovered by phase sensitive detector 37 from the output signal of bias and amplifying circuit 25, i.e. photodetector signal processor 25. On the other hand, the value of $f_{am}$ must be high enough not to be in the frequency band containing rotation information nor within the band with the feedback loop controlling phase modulator 19 to avoid upsetting the operation of that loop. Thus, a value for $f_{am}$ which will range from around one to a few kHz has been found to be satisfactory.

In FIG. 2A, the signal at the output of amplifier 41 ahead of the input of generator 27 is supplied to the signal input of a phase sensitive detector, 51, for this recovery purpose. The reference input of phase sensitive detector 51 is connected to amplitude modulation signal generator 50 to receive a sinusoidal signal at frequency $f_{am}$ therefrom.

Phase sensitive detector 51 provides an output signal representing the amplitude of the frequency component at frequency $f_{am}$ in the signal $v_{27}$ provided to its signal input multiplied by a factor that more or less yields its root-mean-square value and multiplied by a further factor representing the phase difference between the signal at the signal input and the reference signal at the reference input. A further detector effective gain factor may multiply this result. Thus, the output signal at phase sensitive detector 51, $v_{51-Ke}$, thus has the following form:

$$v_{51-Ke} = b_1\Delta\Omega_{Ke} = b_2\Delta(\Delta f_{Ke})$$

where $\Delta\Omega_{Ke}$ is the root-mean-square or other time average value of $\Delta\Omega Ke$, and the coefficients $b_1$ and $b_2$ represent the phase factor described above and the other factors affecting the amplitude of the output signal of phase sensitive detector 51, and the coefficients relating to the corresponding variables as set out in the preceding equation. Hence, this output signal $v_{51}$ provided by phase sensitive detector 51 is related to the periodic change in the optical Kerr effect rotational rate error arising because of the amplitude modulation of laser 22, and so to the corresponding resonant frequency difference due to that effect.

Thus, having found a measure of $\Delta\Omega_{Ke}$, or at least its time average value, there remains the requirement of finding a measure of the quantities $I_o$ and $\Delta I_o$ in the ratio set out above from which $\Omega_{Ke}$ is to be found. In finding the optical Kerr effect rotational rate error above, the intensity falling on photodiode 23 due to the counterclockwise electromagnetic wave in coil 10 was indicated to be $$I_{ccw-d} =$$

$$(1-\gamma_1)(1-\gamma_2)(1-k_1)(1-k_2)p^2 I_o e^{-\frac{\alpha L}{2}} \Gamma(\Delta_{ccw} + \theta_{Kccw})$$

The effect of the amplitude modulation of laser 22 on this intensity, redesignated in this situation as $I_{ccw-d-am}$, can be expressed as a summed pair of terms again because the input electromagnetic wave intensity $I_o$ appear linearly in this last equation, or $$I_{ccw-d-am}$$

$$(1-\gamma_1)(1-\gamma_2)(1-k_1)(1-k_2)p^2 \overline{I}_o e^{-\frac{\alpha L}{2}} \Gamma(\Delta_{ccw} + \theta_{Kccw}) +$$

$$(1-\gamma_1)(1-\gamma_2)(1-k_1)(1-k_2)p^2 \Delta I_o e^{-\frac{\alpha L}{2}} \Gamma(\Delta_{ccw} + \theta_{Kccw})$$

where $$I_o = \overline{I}_o + \Delta I_o.$$

In these equations, $\overline{I}_o$ is the time average value of the intensity of the input electromagnetic waves provided by laser 22, and $\Delta I_o$ again is a sinusoidal function of time and frequency $f_{am}$. Hence, $I_{ccw-d-am}$ has a term which depends on the time average value of the input electromagnetic wave intensity and another which depends on the sinusoidal modulation portion of the intensity, Thus, corresponding signal components provided by photodiode 23 and photodetector signal processing circuit 25 can be appropriately selected to provide a representation of $I_o$ and $\Delta I_o$, as is required. Of course, both terms also contain harmonics of the bias modulation frequency $f_n$, but these higher frequency components will be eliminated in the selection process just mentioned.

The selection of a signal component from the output of photodetector signal processor 25 related to electromagnetic wave input intensity $I_o$ from laser 22 can be obtained by use of a low pass filter as a time averaging component. Such a filter, with a cutoff significantly less than the frequency value of modulation frequency $f_{am}$, will eliminate the signal portion of the output signal of processor 25 corresponding to the second term in the expression for $I_{ccw-d-am}$, and will further eliminate the harmonics of the bias modulation frequency $f_n$ in the portion of the signal from processor 25 corresponding to the first term.

Thus, the output signal of processor 25 is connected to the input of a low pass filter, 52, in the system portion shown in FIG. 2A. The output signal of filter 52, $v_{52}$, with the time based components eliminated is then $$v_{52} = b_3 I_o,$$

where the coefficient $b_3$ represents all of the constants in the first term of the expression for $I_{ccw-d-am}$, and the conversion factor and effective gain of the combination of photodiode 23 and processor 25.

Selection of a signal component related to $\Delta I_o$ is accomplished by demodulating the signal from processor 25 to obtain the amplitude of the frequency component therein having a frequency of $f_{am}$. Such demodulation is provided in the system portion of FIG. 2A by the use of a further phase sensitive detector, 53, which receives the output signal of processor 25 in FIG. 2B at its signal input, and receives the sinusoidal output signal of generator 50 of frequency $f_{am}$ at its reference signal input.

Phase sensitive detector 53 again provides an output related to some constant multiplying the amplitude of the sinusoidally varying intensity portion of the output signal from processor 25 based on $\Delta I_o$ to give a root-mean-square or other time average value thereof. A further factor multiplies this quantity related to the difference in phase between the reference signal applied to the reference signal input and the frequency component at frequency $f_{am}$ in the output signal of processor 25. These factors are multiplied by the conversion factor and effective gain involved in photodiode 23 in processor 25, and by the constant factors in the second term in the expression representing the intensity of the counterclockwise electromagnetic wave falling on photodiode 23 after removal of the other frequency components. These factors can then be combined to give the resulting output signal of phase sensitive detector 53, $v_{53}$, as $$v_{53} = b_4 \Delta I_o.$$

Thus, corresponding measures have been obtained in the portion of the system in FIGS. 2A and 2B described so far for each of the components needed to evaluate $\Omega_{Ke}$ through use of the ratio found above based on the Kerr effect rotational rate error, or $$\frac{\Delta \Omega_{Ke}}{\Omega_{Ke}} = \frac{\Delta I_o}{I_o},$$

if the time average of this last equation is taken with the result $$\frac{\overline{\Delta \Omega_{Ke}}}{\Omega_{Ke}} = \frac{\overline{\Delta I_o}}{I_o}.$$

This is a satisfactory result if the time average of the optical Kerr effect rotational rate error is a satisfactory approximation of the instantaneous optical Kerr effect rotational rate error. This result will nearly always be satisfactory as the amplitude of that error is expected to change slowly aside from the change due to the amplitude modulation of laser 22.

Thus, the time average value of the optical Kerr effect rotational rate error has a value based on the obtained system measures of $$\Omega_{Ke} = \frac{I_o}{\Delta I_o} \overline{\Delta \Omega_{Ke}} = \frac{b_4}{b_1 b_3} \frac{v_{51} v_{52}}{v_{53}}$$

As shown above, there is a corresponding resonant frequency difference for the optical Kerr effect rotation rate error. Hence, $$\frac{I_o}{\Delta I_o} = \frac{\Omega_{Ke}}{\Delta \Omega_{Ke}} = \frac{\Delta f_{Ke}}{\Delta(\Delta f_{Ke})}$$

Therefore, the effect on the system output signal can be directly found as:

$$\Delta f_{Ke} = \frac{I_o}{\Delta I_o} \Delta(\Delta f_{Ke}) = \frac{b_4}{b_2 b_3} \frac{v_{51} v_{52}}{v_{53}}$$

One manner for using the measures $v_{51}$, $v_{52}$ and $v_{53}$, at the outputs of phase sensitive detector 51, filter 52 and phase sensitive detector 53, respectively, to provide a signal equal to the time average of the Kerr effect rotational error, or a rotation rate signal compensated for that error, is shown in the remainder of FIG. 2A. A divider, 54, is used to find the ratio of the output signal $v_{52}$ of filter 52 with respect to the output signal $v_{53}$ of phase sensitive detector 53. A multiplier, 55, then multiplies the resulting voltage ratio $v_{52}/v_{53}$ by the value of the output signal of phase sensitive detector 51, $v_{51}$.

The output signal from multiplier 55 is then provided to the control input of a controlled serrodyne generator, 56. The conversion factor for converting voltage to frequency of the serrodyne signal at the output of generator 56 is set to be equal to $b_4/b_2 b_3$. Thus, the output frequency of generator 56 represents the optical Kerr effect rotation rate error. Controlled serrodyne generator 56 is constructed in substantially the same way as is controlled serrodyne generator 27, and therefore generator 56 is represented as a single block in FIG. 2A without adding the details of the internal block diagram therefor.

The output signal from controlled serrodyne generator 27 is additionally provided to the input of a reset pulse generator, 57, which detects each serrodyne waveform reset and provides a short duration output pulse upon each such detection. Similarly, the output of controlled serrodyne generator 56 is provided to a further reset pulse generator, 58, which provides the same capability as does generator 57. The output of reset pulse generator 57 is provided to the up counting input of an up/down counter, 59. The output pulses from generator 58 are provided to the down counting input of up/down counter 59. In this manner, the counts generated by generator 58 are subtracted from those generated by generator 57 in counter 59 so that the cumulative total in counter 59 represents the frequency difference between the counter-propagating waves in coil 10 corrected for Kerr effect rotational errors.

Alternatively, these results could be obtained by digitizing the values of $v_{51}$, $v_{52}$ and $v_{53}$ and supplying these digitized values to a microprocessor. The values of $b_1$, $b_2$ and $b_3$ can be stored in the microprocessor, or measured and sent thereto, and arithmetic circuitry therein can be used to calculate and provide such results.

There are a number of variations in the implementation of a resonator fiber optic gyroscope system which differ from the core systems shown FIGS. 1, and 2A and 2B. However, the compensation arrangement added to the basic system of FIG. 1 FIGS. 2A and 2B can also, in essence, be used with such variants of the basic system shown in FIG. 1. One typical variation is to use a common bias modulation arrangement for bias modulating both the clockwise and counterclockwise electromagnetic waves rather than the separate bias modulation means shown in FIGS. 1 and 2 having phase modulators 19 and 20 supplied by bias modulation generators 29 and 28 at frequencies $f_n$ and $f_m$, respectively.

Such a common modulation source can be provide through bias modulating the waves emitted by laser 22, for instance. Alternatively, another phase modulator can be used in a common path such as the input path between laser 22 and junction 21 in optical integrated chip 16. Of course, a cavity length transducer capable of stretching the optical fiber in coil 10 is another means.

In all these bias modulation variants, the optical Kerr effect rotational rate error $\Omega_{Ke}$ found above, $$\Omega_{KE} = C_1 I_o \{(q^2 - p^2) - C_2(\Delta\beta_m - \Delta\beta_n)L(p^2 + q^2)\},$$

is altered. Since in these circumstances $\Delta\beta_m = \Delta\beta_n$, the second term in the braces will be zero. Nevertheless, the same compensation arrangement can be used with such a basic system having a common bias modulation source for both the clockwise and counterclockwise electromagnetic waves therein. The error compensated will, of course, be less in such a system than it would have been for unequal bias modulation amplitudes.

The system shown in FIGS. 1 and 2 is often termed a "transmissive" resonator fiber optic gyroscope system. A "reflective" resonator fiber optic gyroscope system is another alternative which is shown in FIG. 3, and in which the optical Kerr effect rotational rate error is compensated by use of essentially the same compensation system.

The major difference in the "reflective" resonator fiber optic gyroscope system is that there is but a single coupler optically connecting resonator 10 with the remainder of the system. That is, a coupler designated 11,12 is shown in FIG. 3 which couples electromagnetic waves into resonator 10 from, and out of resonator 10 to, an external optical fiber designated 14,15, serving as both the input optical fiber and the output optical fiber for the system. This is possible because of the use of two further optical couplers, 100 and 101, which couple electromagnetic waves from external optical fiber 14,15 to photodetectors 24 and 23, respectively. In addition, optical coupler 100 couples electromagnetic waves from external optical fiber 14,15 to a further photodetector, 24'.

The outputs of these photodetectors are provided to corresponding photodetector bias and signal processing circuits, 26, 25, and 26', respectively Photodetector bias and signal processing circuits 26 and 25 then provide signals to the same kinds of feedback loop arrangements in FIG. 3 as similarly designated photodetector bias and signal processing circuits do in the system of FIGS. 2A and 2B. Photodetector signal processing circuit 26' provides an output signal therefrom to filter 52 and phase sensitive detector 53 to provide the basis for determining current values of $I_o$ and $\Delta I_o$.

The output of phase sensitive detector 51, filter 52, and phase sensitive detector 53 are shown in FIG. 3 to be provided to a microprocessor, 102. Microprocessor 102 has appropriate constants stored therein, or measured and supplied thereto, and has the capability through arithmetic procedures therein to provide either or both the optical Kerr effect rotational rate error and the system rotational rate compensated for any such error therein.

The major difference in operation here is that the electromagnetic waves reaching photodetectors 23 and 24 are not only those waves which have been circulating in resonator 10 but also corresponding portions of the input electromagnetic waves which are not coupled into resonator 10 by optical coupler 11,12. Thus, there are two pairs of electromagnetic waves in external fiber 14,15 with each member of each pair following a different path than the other, and with each pair reaching a corresponding one of photodetectors 23 and 24. This leads to each pair member interfering with the other in that pair in impinging on the photodetector corresponding to that pair. That is, the electric field components of the electromagnetic waves reaching photodetector 23 can be represented as:

$$E_{d-23} = c_1 q E_{in}^1 + c_2 E_{ccw}$$

where $E_{d-23}$ represents the electric field component of the electromagnetic waves reaching photodetector 23, $qE_{in}^1$ represents the input electromagnetic radiation provided through integrated waveguide 17, $E_{ccw}$ represents the counterclockwise electromagnetic waves which have been coupled back into external fiber 14,15 from resonator 10, and constants $c_1$ and $c_2$ represent the effects of various fractional couplings, losses, and phase delays on these electromagnetic wave components reaching photodetector 23.

Similarly, the electric field components of the electromagnetic waves reaching photodetector 24 can be represented as:

$$E_{d-24} = c_3 p E_{in}^1 + c_4 E_{cw}$$

with $E_{d-24}$ representing the electric field component of the electromagnetic waves reaching photodetector 24, $pE_{in}^1$ representing the electromagnetic wave electric field component in external fiber 14,15 provided through integrated waveguide 18, $E_{cw}$ representing the clockwise traveling electromagnetic waves which have been coupled back into external optical fiber 14,15 from resonator 10, and constants $c_3$ and $c_4$ again representing various fractional couplings, losses and phase delays on these electromagnetic wave electric field components reaching photodetector 24.

Because the electric field components from two different optical paths in the electromagnetic waves reaching photodetectors 23 and 24 will interfere with each other upon arrival, the intensities at these detectors must be written as:

$$I_{d-23}=E_{d-23}\cdot E_{d-23}^{*}=|c_{1q}E_{in}^{1}|^{2}+|c_{2}E_{ccw}|^{2}+2\cdot |c_{1q}E_{in}^{1}||c_{2}E_{ccw}|\cos\sigma_{1}$$

$$d_{d-24}=E_{d-24}\cdot E_{d-24}^{*}=|c_{3p}E_{in}^{1}|^{2}+|c_{4}E_{cw}|^{2}+2| c_{3p}E_{in}^{1}||c_{4}E_{cw}|\cos\sigma_{2}$$

with $\sigma$ being the phase difference between the components of the electromagnetic waves from two paths reaching a corresponding photodetector. As a result, the equations characterizing the system of FIG. 3 will differ somewhat from the equations given previously characterizing the system of FIGS. 2A and 2B. In fact, the occurrence of resonance in resonator 10 leading to a peak in the electromagnetic energy therein at the frequency given such resonance will lead to a cancellation at the photodetectors in FIG. 3 so that resonance is represented by a null in the intensity impinging on those photodetectors. Nevertheless, an analysis of the system of FIG. 3 taking these differences into account will yield equations showing a similar result for the optical Kerr effect rotational rate error. Thus, a similar compensation arrangement can be used with the system of FIG. 3 as was used with the system of FIGS. 2A and 2B.

Although the present invention has been described with reference to preferred embodiments, workers skilled in the art will recognize that changes may be made in form and detail without departing from the spirit and scope of the invention.

What is claimed is:

1. An error compensator for providing compensation of rotation rate errors arising because of an optical Kerr effect in a coiled optical fiber in a rotation sensor capable of sensing rotation about an axis of said coiled optical fiber formed in a closed optical path in conjunction with at least a first coil coupler which is connected therewith such that electromagnetic waves can be coupled between said coiled optical fiber and a first external optical fiber, said rotation sensing based on having opposing electromagnetic waves propagating through said coiled optical fiber in opposing directions so as to result in each said opposing optical fiber electromagnetic wave impinging at least in part on a corresponding one of first and second photodetectors in a plurality of photodetectors each coupled to a selected one of said coiled optical fiber and said external optical fiber with at least one of said opposing coiled optical fiber electromagnetic waves propagating in one of said opposing directions being subject to having the phasing thereof varied by selected signals supplied to a first input of a first phase modulator, said first photodetector providing an output signal in response to such impingement thereon of a corresponding said opposing coiled optical fiber electromagnetic wave which is representative of that wave, said error compensator comprising:

a controlled frequency adjustment signal generator means having a frequency adjustment input and having an output electrically connected to said first phase modulator first input, said first controlled frequency adjustment signal generator means being capable of providing an output signal at said output thereof having a basic waveform repeated at a selected first shift operation frequency of a value selected based on signals appearing on said frequency adjustment input;

a signal component selection means having an input electrically connected to said first photodetector to receive said first photodetector output signal, and an output electrically connected to said first controlled frequency adjustment signal generator means frequency adjustment input, said first signal component selection means being capable of extracting a desired signal component from said photodetector output signal and providing an output signal based thereon at said output thereof;

an amplitude modulation signal generator means capable of providing amplitude modulation component in said opposing coiled optical fiber electromagnetic waves; and a compensation means having a first input electrically connected to at least one of said plurality of photodetectors to receive a corresponding photodetector output signal, said compensation means being capable of extracting a plurality of differing characteristics from said corresponding photodetector signal and combining them so as to result in a determination of substantially that rotation rate error due to said optical Kerr effect in said coiled optical fiber.

2. The apparatus of claim 1 wherein said compensation means has a second input electrically connected to said first signal selection means output to obtain a signal therefrom based on said first photodetector signal.

3. The apparatus of claim 1 wherein said compensation means comprises a low pass filter means for obtaining a first characteristic signal from said first photodetector output signal.

4. The apparatus of claim 1 wherein said basic waveform consists of a relatively long duration of substantially monotonically changing magnitude in one magnitude direction followed by a much shorter duration of substantially monotonically changing magnitude in an opposite magnitude direction.

5. The apparatus of claim 1 wherein said first external optical fiber is positioned with respect to said first phase modulator such that electromagnetic waves passing through at least a portion thereof also pass through said first phase modulator so as to be subject to having phases thereof varied in response to selected signals applied to said first phase modulator first input.

6. The apparatus of claim 1 wherein said controlled frequency adjustment signal generator means has said output thereof electrically connected to said first phase modulator first input through a resonance determination summing means having a first input electrically connected to said controlled frequency adjustment signal generator means output and having an output electrically connected to said first phase modulator first input, said resonant determination summing means also having a second input and being capable of combining selected signals provided at said first and second inputs thereof to provide an output signal on said output thereof based on such combined signals; and wherein said apparatus further comprises a first resonance determination signal generating means having an output electrically connected to said resonance determination summing means second input, said first resonance determination signal generator means being capable of providing an output signal containing a substantial signal component at a selected resonance monitoring frequency.

7. The apparatus of claim 1 further comprising a supplementary phase modulator positioned with respect to said first phase modulator such that electromagnetic waves subject to having phases thereof varied in response to selected signals applied to said first phase modulator first input are also subject to having phases thereof varied in response to selected signals applied to a first input of said supplementary phase modulator; and wherein said apparatus yet further comprises a first resonance determination signal generating means having an output electrically connected to said supplementary phase modulator first input, said first resonance determination signal generator means being capable of providing an output signal containing a substantial signal component at a selected resonance monitoring frequency.

8. The apparatus of claim 2 wherein said compensation means comprises a low pass filter means for obtaining a first characteristic signal from said first photodetector signal.

9. The apparatus of claim 3 wherein said compensation means further comprises a first compensation phase detection means for obtaining a second characteristic signal from said first photodetector signal having both a detection input, electrically connected to said first photodetector to receive said first photodetector output signal, and a demodulation input, electrically connected to receive a signal from said amplitude modulation signal generator means, said first compensation phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

10. The apparatus of claim 5 wherein said first external optical fiber and said first phase modulator are part of a coiled optical fiber input means capable of having opposing electromagnetic waves, supplied from a common source of electromagnetic waves, propagate commonly through both of said first external optical fiber and said first phase modulator in opposite directions.

11. The apparatus of claim 5 wherein said colored optical fiber is a single spatial mode optical fiber exhibiting birefringence so that differing indices of refraction occur along corresponding axes having an angular relationship with one another on cross sections of said optical fiber, and wherein said closed optical path including said coiled optical fiber has a transfer means therealong for transferring electromagnetic radiation propagating along one of said axes into propagating along another of said axes.

12. The apparatus of claim 5 wherein said coiled optical fiber is a single spatial mode optical fiber exhibiting birefringence so that differing indices of refraction occur along corresponding axes having an angular relationship with one another on cross sections of said optical fiber, and wherein said closed optical path including said coiled optical fiber has a polarizer therein for transmitting electromagnetic waves of a corresponding polarization along one said axis and blocking transmission of electromagnetic waves another corresponding polarization along another said axis.

13. The apparatus of claim 5 wherein said first external optical fiber has first and second output couplers connected therewith such that electromagnetic waves can be coupled between said first external optical fiber and a corresponding output optical path leading to a corresponding one of said first and second photodetectors.

14. The apparatus of claim 5 wherein said coiled optical fiber has a second coil coupler connected therewith such that electromagnetic waves can be coupled between said coiled optical fiber and a second external optical fiber, said second coil coupler having a pair of ends each positioned so that electromagnetic waves emanating therefrom impinge on a corresponding one of said first and second photodetectors.

15. The apparatus of claim 6 wherein said signal component selection means further comprises a first frequency adjustment phase detection means having both a detection input, electrically connected to said first photodetector to receive said first photodetector output signal, and a demodulation input, electrically connected to said first resonance determination signal generating means output, and having an output electrically connected to said controlled frequency adjustment signal generator means frequency adjustment input, said first frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

16. The apparatus of claim 7 wherein said signal component selection means further comprises a first frequency adjustment phase detection means having both a detection input, electrically connected to said first photodetector to receive said first photodetector output signal, and a demodulation input, electrically connected to said first resonance determination signal generating means output, and having an output electrically connected to said controlled frequency adjustment signal generator means frequency adjustment input, said first frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

17. The apparatus of claim 8 wherein said compensation means further comprises a first compensation phase detection means for obtaining a second characteristic signal from said first photodetector signal having both a detection input, electrically connected to said first photodetector to receive said first photodetector output signal, and a demodulation input, electrically connected to receive a signal from said amplitude modulation signal generator means, said first compensation phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

18. The apparatus of claim 15 in which said second photodetector also provides an output signal in response to impingement thereon of a corresponding said opposing coiled optical fiber electromagnetic wave which is representative of such wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a first control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a selected resonance monitoring frequency; and yet further comprises a second frequency adjustment phase detection means having both a detection input, electrically connected to said second photodetector to receive said second photodetector output signal, and a demodulation input, electrically connected to said second resonance determination signal generating means output, and having an output electrically connected to said common source means first control input, said second frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

19. The apparatus of claim 15 wherein said signal component selection means further comprises an integrator having an output electrically connected to said first frequency adjustment phase detection means output.

20. The apparatus of claim 16 in which said second photodetector also provides an output signal in response to impingement thereon of a corresponding said opposing coiled optical fiber electromagnetic wave which is representative of that wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a selected resonance monitoring frequency; and yet further comprises a second frequency adjustment phase detection means having both a detection input, electrically connected to said second photodetector to receive said second photodetector output signal, and a demodulation input, electrically connected to said second resonance determination signal generating means output, and having an output electrically connected to said common source means first control input, said second frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

21. The apparatus of claim 16 wherein said signal component selection means further comprises an integrator having an output electrically connected to said first frequency adjustment phase detection means output.

22. The apparatus of claim 17 wherein said compensation means further comprises a second compensation phase detection means for obtaining a third characteristic signal from a component of said first photodetector signal having both a detection input, electrically connected to said compensation means second input to receive said signal based on said first photodetector output signal, and a demodulation input, electrically connected to receive a signal from said amplitude modulation signal generator means, said second compensation phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

23. The apparatus of claim 18 wherein said common source has a second control input to which an output of said amplitude modulation means is electrically connected.

24. The apparatus of claim 20 wherein said common source has a second control input to which an output of said amplitude modulation means is electrically connected.

* * * * *

UNITED STATES PATENT AND TRADEMARK OFFICE
CERTIFICATE OF CORRECTION

PATENT NO. : 5,349,441
DATED : September 20, 1994
INVENTOR(S) : Glen A. Sanders

It is certified that error appears in the above-indentified patent and that said Letters Patent is hereby corrected as shown below:

Column 27, Line 39, replace "colored" with --coiled--.

Column 27, Line 58, insert --of-- after waves.

Signed and Sealed this

Fifth Day of September, 1995

Attest:

BRUCE LEHMAN

Attesting Officer

Commissioner of Patents and Trademarks